United States Patent
Fletcher et al.

[11] 3,758,877
[45] Sept. 11, 1973

[54] POWER SUPPLY FOR CARBON DIOXIDE LASERS

[76] Inventors: James C. Fletcher, Administrator of the National Aeronautics And Space Administration, with respect to an invention of; Gerhard Schiffner, Hinterbruehl, Austria

[22] Filed: May 9, 1972

[21] Appl. No.: 251,621

[52] U.S. Cl............ 331/94.5, 307/157, 315/101, 315/258, 315/356, 315/DIG. 2, 330/4.3
[51] Int. Cl........................... H01s 3/09, H01s 3/22
[58] Field of Search.......................... 307/150, 157; 315/101, 258, 356, DIG. 2; 331/94.5; 330/4.3

[56] References Cited
UNITED STATES PATENTS

| | | | |
|---|---|---|---|
| 3,356,891 | 12/1967 | Goddard | 307/157 X |
| 3,688,123 | 8/1972 | Walker | 307/157 |

OTHER PUBLICATIONS

McElroy et al., Goddard Space Flight Center, Tech. Report (Oct. 1967) titled "Aperture Coupling Of A Carbon Dioxide Laser Employing An Ear Confocal Optical Resonator", pp. 1–4 (see pp. 283 especially).

Primary Examiner—Ronald L. Wibert
Assistant Examiner—R. J. Webster
Attorney—R. F. Kempf et al.

[57] ABSTRACT

In a power supply for a $CO_2$ laser tube including an A.C. source, a rectifier and a filter, an inductance connected in front of the rectifier provides a non-dissapative positive resistance effect for cancelling the negative differential resistance exhibited by the tube at frequencies below about 2kHz. The inductance replaces the ballast resistors usually used for the same purposes and provides a resultant increase in system efficiency. The frequency of the A.C. source is preferably in excess of 25 kHz thus taking advantage of the low amplitude and frequency fluctuations at high frequencies and enabling the use of a low value filter capacitor.

10 Claims, 5 Drawing Figures

POWER SUPPLY FOR CARBON DIOXIDE LASERS

ORIGIN OF THE INVENTION

The invention described herein was made in the performance of work under a NASA contract and is subject to the provisions of Section 305 of the National Aeronautics and Space Act of 1958, Public Law 85-568 (72 STAT. 435; 42 U.S.C. 2457).

FIELD OF THE INVENTION

The present invention relates to an improved power supply for a $CO_2$ laser tube.

BACKGROUND OF THE INVENTION

One important requirement for power supplies for carbon dioxide laser tubes is that they provide an internal resistance which is larger than the absolute value of the differential resistance of the tube. Because the differential resistance of a $CO_2$ laser tube is negative, without the provision of an appropriate resistance for the power supply the tube cannot be operated on a continuous, stable basis. In this regard, it is noted that $CO_2$ lasers such as used for communications purposes must be operated with a relatively well regulated and filtered D.C. current. In order to provide the required resistance, prior art power supplies usually include a ballast resistor. However, this approach suffers a number of disadvantages and, in particular, ballast resistors dissipate a relatively large amount of power and reduce the overall efficiency of the system. This reduction in system efficiency is a serious problem for space applications of $CO_2$ lasers.

A further prior art proposal involving a $CO_2$ laser transceiver provides for a power supply which includes a transistorized voltage regulator. The regulator provides a high resistance and a relatively small voltage drop, and reduces the power loss as compared with a ballast resistor. However, the use of transistors in the high voltage circuit is a significant disadvantage. Specifically, the use of transistors, because of their sensitivity to voltage overloads, makes the circuit critical to the system operation and hence reduces the overall reliability. Although vacuum tubes which are relatively insensitive to voltage overloads can be used to replace the transistors, the power requirements for the filaments of such tubes are such that no appreciable gain in efficiency results.

SUMMARY OF THE INVENTION

In accordance with the present invention an improved power supply for $CO_2$ laser tubes is provided wherein the need for ballast resistors in exciting a stable discharge is eliminated. The invention is based on the valuable appreciation that the differential resistance of a $CO_2$ laser tube is negative only for relatively low frequencies, e.g., on the order of 1 kHz. The invention takes advantage of this appreciation by utilizing an inductance to provide the necessary stabilizing resistance at low frequencies, hence eliminating the need for a ballast resistor and producing an attendant increase in overall efficiency as compared with conventional D.C. supplies. Further, by operating the A.C. voltage supply at relatively high frequencies, and by generating a D.C. voltage for discharge excitation by means of a rectifier, a relatively low value of filter capacitor can be used, thus reducing the weight and cost of the supply. Further, the resultant high ripple frequency produces a considerable decrease in the amplitude and frequency fluctuations of a D.C. excited $CO_2$ laser.

According to a presently preferred embodiment of the invention, a power supply for a $CO_2$ laser comprises a transformer connected to an A.C. voltage supply, a rectifier for rectifying the output of the transformer, a filter capacitor for filtering the output of the rectifier and an inductance connected in front of the rectifier for producing the requisite stabilizing output resistance at low frequencies. The frequency of the A.C. voltage supply is chosen to be in excess of 1 kHz and is preferably in excess of 25 kHz. The inductance is preferably provided by an inductor connected on the primary side of the transformer because this minimizes the electrical isolation problems.

Other features and advantages of the invention will be set forth in, or apparent from, the detailed description of a preferred embodiment found hereinbelow.

DESCRIPTION OF THE PREFERRED EMBODIMENTS

Figure 1:
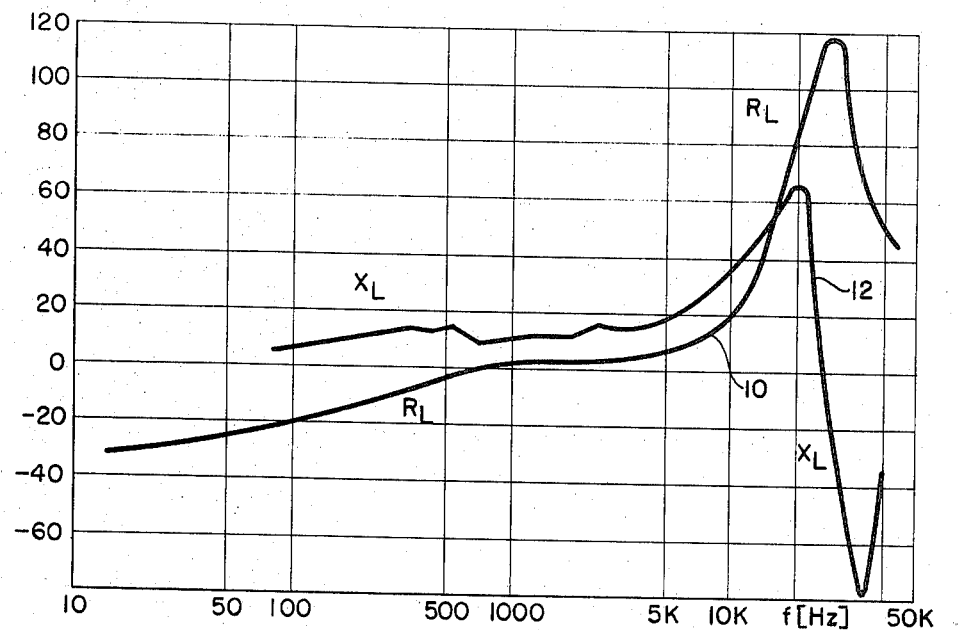
FIG. 1 is a plot of the real and reactive components of the impedance of a D.C. excited $CO_2$ laser tube as a function of frequency.

As mentioned above, although gas discharge tubes in general maintain the falling characteristics, i.e., negative differential resistance, up to relatively high frequencies (on the order of 100 kHz or more for He-Ne laser tubes), it has been discovered that $CO_2$ laser tubes show a negative resistance only for frequencies below about 1 kHz. Referring to FIG. 1, measurements performed with a D.C. excited $CO_2$ laser (having a discharge voltage of about 3.1 kV) with a 30 volt peak superimposed A.C. voltage of variable frequency are plotted. In FIG. 1, the real component, denoted 10, and the reactive component, denoted 12, of the plasma tube impedance is plotted versus frequency for a discharge tube having an active length of 27 cm. and an internal diameter of 0.8 cm., and filled with 8.8 Torr of a slowly flowing gas mixture of 66.6% He, 16.7% $CO_2$, 16.7% $N_2$. As illustrated, the resistance component is negative for only those frequencies which lie below about 1 kHz. It is also noted that FIG. 1 further illustrates that below about 25 kHz a relatively large inductive component exists.

Figure 2:
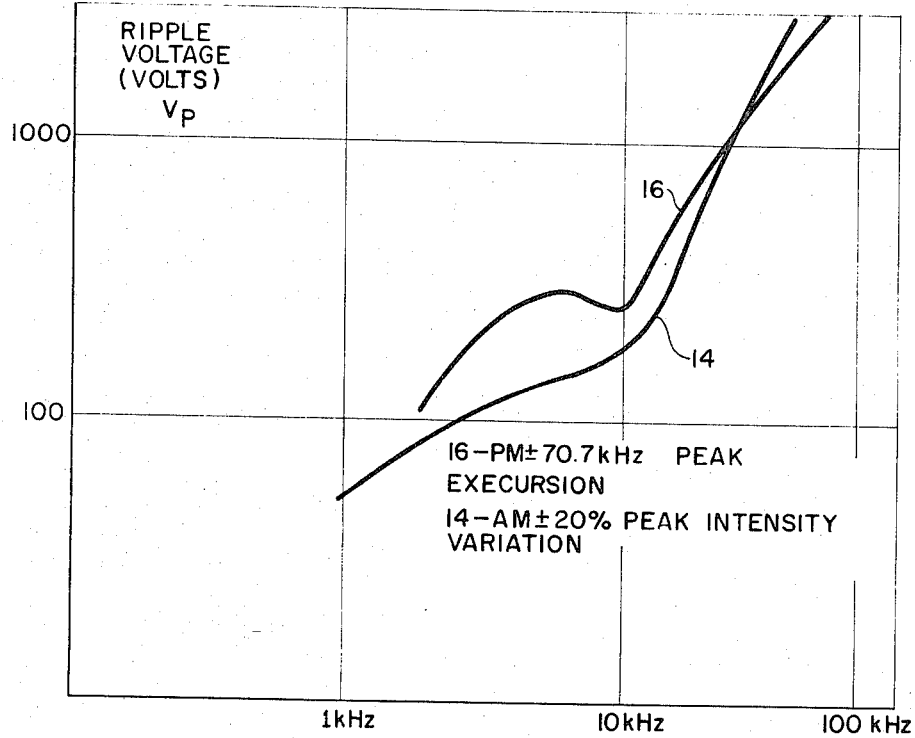
FIG. 2 is a plot of the calculated ripple voltage for a $CO_2$ laser tube as a function of frequency for ± 2 percent amplitude (intensity) modulation (AM) and ± 70.7 kHz frequency excursion (FM)

Referring to FIG. 2, the results are shown of a further experiment performed with the D.C. excited $CO_2$ laser described above and wherein a constant superimposed A.C. voltage of 30 volts peak with variable frequency was utilized. The amplitude and frequency fluctuations were measured using a heterodyne arrangement and from this data the necessary ripple peak voltage was calculated, assuming linear behavior, for producing ± 2 percent amplitude modulation (AM) and ±70.7 kHz peak frequency excursion (FM). In FIG. 2, the ripple voltages are plotted as a function of frequency and, as shown, for frequencies above about 25 kHz the allowed ripple voltages exceed 1,000 volts peak. Hence, as stated above, the amplitude and frequency fluctuations of a D.C. excited $CO_2$ laser with a constant superimposed A.C. voltage decrease considerably with an increase in the frequency of the superimposed voltage. The reason for this is probably the relatively long lifetime of the laser levels and partly due to the high A.C. impedance of the discharge tube at frequencies above about 10 kHz.

Figure 3:
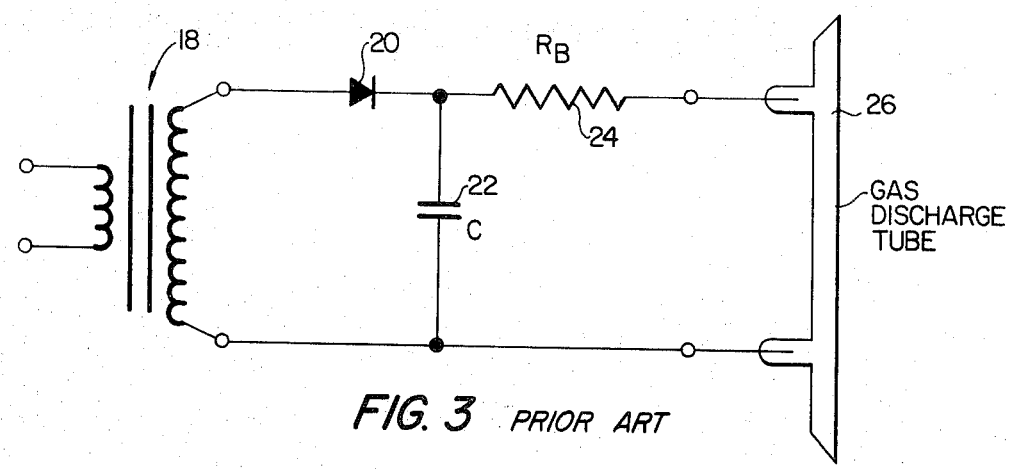
FIG. 3 is a highly simplified schematic circuit diagram of a prior art power supply using a ballast resistor.

As discussed hereinabove, the design of a power supply for stable laser tube operation must take into account that a stable circuit (containing only resistive elements connected in series) requires that the sum of all resistances be positive. Referring to FIG. 3, a prior art power supply circuit providing this positive resistance characteristic is shown. The circuit of FIG. 3, which is highly simplified, includes an input transformer 18 connected to an A.C. voltage supply, a diode rectifier 20 connected in series in the output of the transformer secondary, a parallel-connected filter capacitor 22 and a ballast resistor 24 connected between a point on the junction between diode 20 and capacitor 22 and a gas discharge tube 26. As set forth above, the ballast resistor 24 compensates for the negative differential resistance of gas discharge tube 26.

It should be noted that if the power circuit (all elements connected in series) contains reactive elements, the general rule can be applied that the sum of all impedance should have zeros only in the half plane where $o$ is negative, ($o$ being the real part of the complex frequency $p=o+j\omega$). This condition is fulfilled if, as stated above, the sum of all resistive components is positive for all frequencies.

Figure 4:
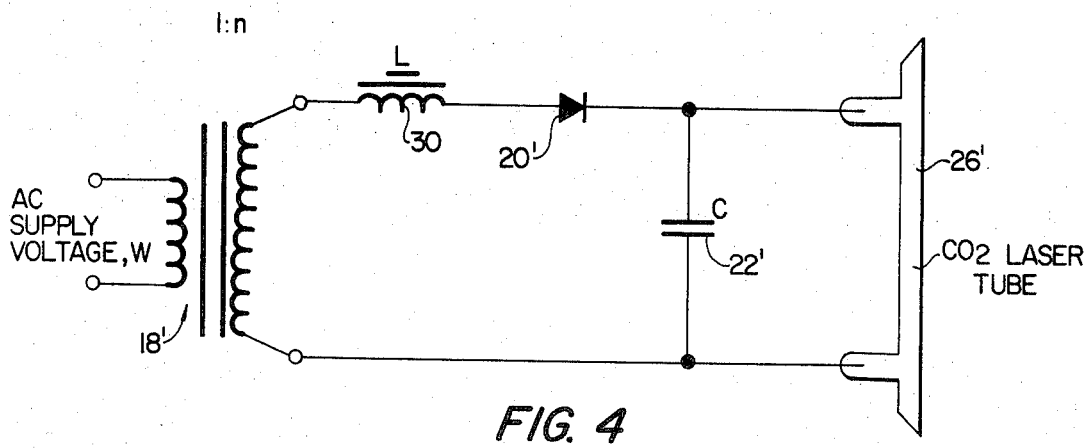
FIG. 4 is a highly simplified schematic circuit diagram of a power supply for a $CO_2$ laser tube in accordance with one preferred embodiment of the invention.

In accordance with the present invention, the use of a ballast resistor is eliminated and the output resistance of the power supply increased through the provision of a reactive element connected in front of the rectifier which, in theory, has no losses. Thus, referring to FIG. 4, wherein elements corresponding to those of FIG. 3 are given the same numbers with primes attached, an inductance 30 is connected between the secondary of transformer 18' and rectifier 20'. Because with a $CO_2$ laser tube it is only necessary to provide or maintain a high output resistance for frequencies below about 1 kHz, the circuit of FIG. 4 will provide the required resistance so long as the capacitance of filter capacitor 22 is kept relatively low. A rough estimate of the output resistance, $R_o$, of the power supply of FIG. 4 is given by the formula $R_o=\omega L$, where $\omega$ is the angular frequency of the A.C. supply voltage and $L$ is the inductance of inductor 30. However, because the rectifier 20' requires a filter capacitor 22', the output impedance of the power supply circuit is low at high frequencies. As discussed above, this low impedance output is acceptable with $CO_2$ lasers and by keeping the capacitance of capacitor 22' relatively low the requisite output resistance can be provided. The capacitance of capacitor 22' can be kept low so long as the frequency of the supply voltage is relatively great. Since, as mentioned above, by making the ripple frequency higher than about 25 kHz good amplitude and frequency stability is provided, the provision of a high supply frequency is entirely compatible with and, in fact, congruent with, stable operation from this standpoint as well.

Figure 5:
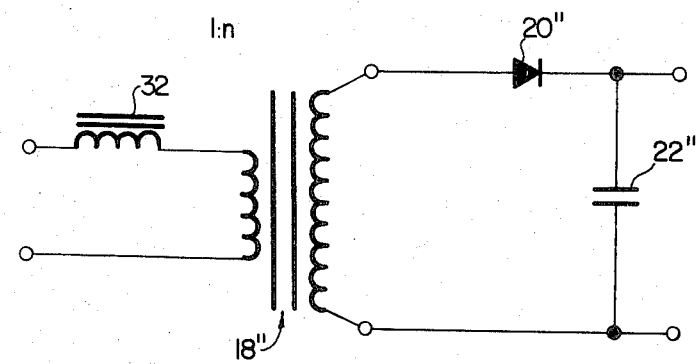
FIG. 5 is a highly simplified schematic circuit diagram of a power supply in accordance with a second preferred embodiment of the invention.

Thus, the frequency of the supply voltage should be greater than 1 kHz and preferably greater than 25 kHz. In an experimental arrangement, a signal generator (sinewave or squarewave) was used as an A.C. source, a 50 watt power amplifier utilized and frequencies between 70 kHz and 100 kHz were chosen. The power supply circuit used is generally of the form shown in FIG. 5, which differs from that of FIG. 4 only in the provision of an inductance 32 connected on the primary side of input transformer 18". (Elements of FIG. 5 similar to those of FIG. 4 and FIG. 3, have been given the same reference numbers with double primes attached). The circuit of FIG. 5 provides the advantage that the voltage across the inductance 32 is less than that across inductance 30 of FIG. 4 by a factor of $1/n$ where $n$ is the winding ratio of the transformer 18", the value of inductance 32 being related by the factor $1/n^2$ to the value of inductance 30. Futher, the inductance 32 is not biased by a D.C current. In the experiment referred to above, the value of inductance 32 was chosen to be 0.32 mH. For a frequency of 100 Hz, the impedance value of inductance 32 is approximately 200 ohms. Neglecting the output impedance of the power amplifier which is on the order of only a few ohms, a rough estimate of the output resistance of the power supply is obtained when the impedance value inductance 32 is multiplied by the square of the winding ratio, $n$, of transformer 18" and by the square of the multiplication factor of rectifier 20". It should be noted that because of the difficulty in constructing transformers for the full voltage (about 3kV) at the frequency range in question, a rectifier was used having a voltage multiplication factor of four. The rough estimate obtained was an output resistance of about 115 Kilohms. whereas the actual measured output resistance was 100 Kilohms. The laser operated with 3.15 kV at 10 mA and the ripple voltage was about 20 volts peak, well within the limits provided in FIG. 2.

It should be noted that rather than poviding a discrete inductor as shown in FIGS. 4 and 5, substantially the same effect can be produced by utilizing a transformer having loose coupling between the windings. It will be appreciated that such an approach reduces the number of components necessary for the power supply which is, of course, an important consideration particularly regarding space applications. Further, for space satellites, it is suggested that a D.C. to A.C. converter operating at the desired frequency be used as an A.C. source for the power supply.

Although the invention has been described in reference to exemplary embodiments thereof, those skilled in the art will understand that variations may be effected in these embodiments without departing from the scope and spirit of the invention.

I CLAIM:

1. In combination, a d.c. excited continuous wave $CO_2$ gas laser discharge tube exhibiting a positive differential resistance at frequencies above a predetermined frequency and exhibiting a negative differential resistance at frequencies below said predetermined frequency, and a power supply for said tube comprising an a.c. voltage source for producing a supply voltage having a frequency greater than said predetermined frequency, a rectifier coupled to the output of said a.c.

voltage source for producing a rectified d.c. output; a filter capacitor connected to said rectifier and in parallel with said discharge tube for filtering the output of the rectifier; and an inductance connected in front of said rectifier for stabilizing the output resistance of the power supply at low frequencies.

2. The combination claimed in claim 1 wherein said a.c. source produces a voltage having a frequency in excess of 2kHz.

3. The combination claimed in claim 1 wherein said a.c. source produces a voltage having a frequency in excess of 25kHz.

4. The combination claimed in claim 2 wherein said power supply further comprises a transformer connected to said a.c. source, said inductance being connected on the primary side of said transformer.

5. The combination claimed in claim 2 wherein said power supply further comprises a transformer, said inductance being connected on the secondary side of said transformer in front of said rectifier.

6. In a system comprising a d.c. excited continuous wave $CO_2$ laser tube exhibiting a positive differential resistance at frequencies above a predetermined frequency and exhibiting a negative differential resistance at frequencies below a predetermined frequency, and a power supply for said tube comprising an a.c. voltage source, a rectifier connected to said source and a filter for smoothing the output of said rectifier, the improvement comprising said a.c. source being a high frequency source for producing a voltage having a frequency above said predetermined frequency, and further including an inductance connected in series between said source and said rectifier for providing a nondissapative positive resistance effect to cancel the negative differential resistance exhibited by said $CO_2$ laser tube at low frequencies.

7. A system as claimed in claim 6 wherein said high frequency a.c. source produces a supply voltage having a frequency in excess of 25 kHz.

8. A system as claimed in claim 7 wherein said power supply further comprises a transformer connected to said source and said inductance comprises an inductive element connected on the primary side of said transformer between said transformer and said source.

9. A system as claimed in claim 7 wherein said inductance comprises an inductive element connected in front of said rectifier.

10. A system as claimed in claim 9 wherein said filter comprises a filter capacitor connected to the output of said rectifier in parallel with said laser tube.

* * * * *